(12) United States Patent
Hatzenbuehler et al.

(10) Patent No.: US 7,942,562 B2
(45) Date of Patent: May 17, 2011

(54) ILLUMINATION DEVICE, IN PARTICULAR FOR VEHICLES

(75) Inventors: Andreas Hatzenbuehler, Siefersheim (DE); Burkhard Danielzik, Bingen (DE)

(73) Assignee: Schott AG (DE)

( * ) Notice: Subject to any disclaimer, the term of this patent is extended or adjusted under 35 U.S.C. 154(b) by 190 days.

(21) Appl. No.: 12/055,072

(22) Filed: Mar. 25, 2008

(65) Prior Publication Data
US 2008/0239748 A1 Oct. 2, 2008

(30) Foreign Application Priority Data

Mar. 26, 2007 (DE) .................. 10 2007 014 871

(51) Int. Cl.
*F21V 7/04* (2006.01)
(52) U.S. Cl. .......... 362/555; 362/551; 362/554; 385/92; 385/116
(58) Field of Classification Search .................. 362/555, 362/551, 554, 800; 385/46, 92, 116
See application file for complete search history.

(56) References Cited

U.S. PATENT DOCUMENTS

| | | | |
|---|---|---|---|
| 5,113,244 A | 5/1992 | Curran | |
| 5,271,079 A * | 12/1993 | Levinson | 385/46 |
| 5,647,657 A * | 7/1997 | Damasky et al. | 362/555 |
| 6,270,244 B1 | 8/2001 | Naum | |
| 6,272,269 B1 * | 8/2001 | Naum | 385/43 |
| 7,168,862 B2 * | 1/2007 | Qi et al. | 385/92 |
| 2003/0107887 A1 * | 6/2003 | Eberl | 362/227 |
| 2003/0147254 A1 * | 8/2003 | Yoneda et al. | 362/551 |
| 2006/0044820 A1 * | 3/2006 | Ruffin | 362/554 |
| 2006/0091411 A1 | 5/2006 | Ouderkirk et al. | |
| 2006/0268545 A1 | 11/2006 | McCollum et al. | |
| 2007/0160334 A1 * | 7/2007 | Cobb et al. | 385/116 |

FOREIGN PATENT DOCUMENTS

| | | |
|---|---|---|
| DE | 44 39 547 A1 | 5/1996 |
| DE | 10 2006 004 996 A1 | 8/2006 |
| EP | 1091166 A1 | 4/2001 |
| WO | 2006054199 A1 | 5/2006 |

OTHER PUBLICATIONS

Dr.-Ing Karszewski, "DE Application No. 10 2007 014 871.4 Office Action", Apr. 29, 2009, Publisher: Deutsches Patent-und Markenamt, Published in: DE.
Steffen Wolf, "EP Application No. EP 08005609 Search Report", Nov. 26, 2009, Publisher: EPO, Published in: EP.

\* cited by examiner

*Primary Examiner* — Evan Dzierzynski
(74) *Attorney, Agent, or Firm* — DeMont & Breyer LLC

(57) ABSTRACT

The invention relates to an illumination device, in particular for vehicles. The illumination device comprises at least two semiconductor light sources which emit light with different colours, as well as at least one light guide into which the light from the semiconductor light sources is injected, and a light mixer device that is arranged on the entry side of the light guide and has a transparent light-refracting element, by which the spatial distribution of the light from the light sources is mixed so as to generate light that constitutes a colour superposition of the light from the semiconductor light sources. The transparent light-refracting element comprises an end face which forms a light entry face for the light emitted by the semiconductor light sources, the semiconductor light sources being arranged next to one another and in front of the light entry face.

24 Claims, 4 Drawing Sheets

ILLUMINATION DEVICE, IN PARTICULAR FOR VEHICLES

Figure 1:
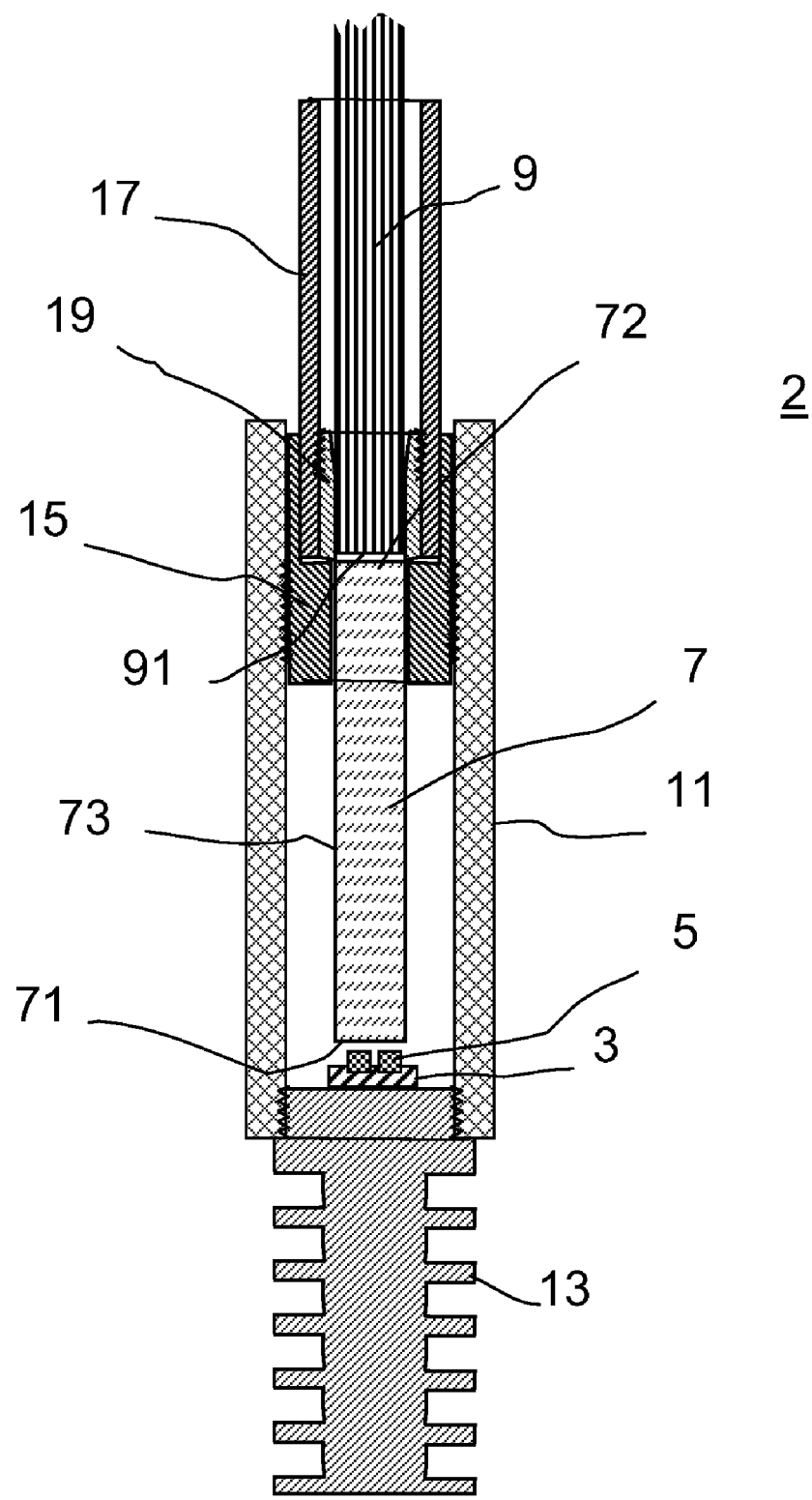

The invention relates in general to illumination for vehicles, in particular illumination devices having semiconductor lighting elements.

Light-emitting diodes are being used to an increasing extent as lighting elements for illumination purposes. The difficulty in this case involves the generation of white light. In order to generate white light by light-emitting diodes, white-light LEDs are generally used which comprise a blue-emitting LED, the light from which is partially converted by fluorescent dyes so as to obtain a broadband spectrum. Compared with the light from light bulbs, however, this light appears relatively cold owing to the blue content. Furthermore, modification of the dye after a prolonged time may lead to shifts in the colour locus.

In the case of illumination by light-emitting diodes, problems furthermore often occur with the uniformity of the illumination. Irregularities result in particular from the use of a plurality of LEDs, which prior or in the course of time have different brightnesses or colours. Problems may likewise be encountered when the intention is to provide more complex luminous shapes, for instance specially configured illuminated control elements, for example switches. In this case, differing brightnesses may occur along the illuminated face.

It is therefore an object of the invention to provide an illumination device, in particular for vehicles, which is improved in respect of the requirements and problems mentioned above. This object is achieved by the subject-matter of the independent claims. Advantageous configurations and refinements of the invention are specified in the respective dependent claims.

Accordingly, the invention provides an illumination device that comprises at least two semiconductor light sources which emit light with different colours. The illumination device comprises at least one light guide, into which the light from the semiconductor light sources is injected, and a light mixer device that is arranged on the entry side of the light guide and has a transparent light-refracting element, by which the spatial distribution of the light from the light sources is mixed so as to generate light that constitutes a colour superposition of the light from the semiconductor light sources. The transparent light-refracting element comprises an end face which forms a light entry face for the light emitted by the semiconductor light sources, the semiconductor light sources being arranged next to one another and in front of the light entry face.

The colours of the semiconductor light sources may in particular be mixed by total reflection of at least some of the light, which is fed into the light-guiding element, from its wall. To this end, for example, a transparent light-guiding rod is suitable. For such a light-guiding element, it is generally preferable to configure it as a core-cladding element having a light-guiding core and a cladding with a lower refractive index than the core, so that total reflection takes place at the core-cladding interface. Elements without a cladding are nevertheless also possible, in which case the total reflection takes place at its surface.

With such a transparent light-refracting element, effective mixing of the light can readily be induced so that a virtually position-independent colour and intensity are obtained at the end of the light mixer device, as seen in a plane perpendicular to the light propagation direction.

In order to achieve a high efficiency in respect of the light which can be injected into the light-refracting element, it is furthermore favourable for the light-guiding rod to have a light exit face which is coupled to the light guide, and which fully covers the entry face as seen in plan view. In the simplest case, this may be achieved by means of a generally prismatic rod, prismatic being intended to mean a body whose shape is defined by parallel displacement of a surface. In the case of a circular surface, this produces a cylinder.

According to another embodiment of the invention, the transparent rod may also be shaped conically at least along one section, the light entry face being smaller than the light exit face. In this case, the cross-sectional area of the rod thus widens in the light propagation direction. This is favourable so that a particularly large angle range of the light emitted by the semiconductor light sources can be collected and sent to the light guide.

In all cases, irrespective of the shape of the rod, it is favourable for the rod, and particularly its light exit face in this case, to have a shape which is matched to the light entry face of the light guide in order to minimize losses during injection into the light guide. Accordingly, the light exit face of the rod should correspond both in size and in shape to the light entry face of the light guide.

For particularly effective colour mixing according to a refinement of the invention, the light-refracting element may also at least locally have a cross section with straight edges arranged at a right angle to one another. The right-angled edges lead to back-reflection with an antiparallel propagation component perpendicularly to the optical axis. The light is then mixed as would be the case with freely propagating rays, although the rays are guided inside the rod by total reflection from the walls of the light-refracting rod.

The light entry face of the transparent light-guiding element is particularly preferably configured to be plane, or at most curved in such a way that its refracting power does not exceed 1 dioptre in magnitude. This is favourable inter alia so that the semiconductor light sources can be arranged very close to the entry face. To this end, in general, according to a refinement of the invention the distance from the light exit faces of the semiconductor lighting components to the light entry face of the transparent light-refracting element is at most ⅕ of the longest side dimension of the light entry face of the transparent light-refracting element. In the case of a round light entry face, in this embodiment of the invention the distance is thus at most ⅕ of the diameter, or in the case of a square light entry face at most ⅕ of the length of the diagonals.

Surprisingly, for effective light mixing, the transparent light-refracting element may be kept comparatively short. The element, for instance a light-mixing section of a single light guide or in particular a light-guiding rod, may thus have a refractive index, a length and a shape which are dimensioned so that the average number of reflections of all the rays guided through the element and re-emerging from the element is less than 1.2, or in particular even less than one. Light mixing similar to the mechanism of light mixing for free rays, which is very effective, is thus achieved for the non-reflected rays.

Owing to the light refraction at the light entry face, the emitted rays are deviated in the direction of the optical axis so as to increase the proportion of light rays not reflected by the wall. Such geometries may for example be produced when the transparent light-refracting element has a length in the light propagation direction which is at most eight times the smallest lateral dimension of the light entry face, preferably the diameter or the edge length of the light entry face. In the case of a round light entry face, the smallest lateral dimension is the diameter. For square entry faces, the smallest lateral dimension is given by the edge length. In a rectangular entry face, it is correspondingly the shorter edge length of the rectangle.

For the efficiency of the arrangement, it is also favourable for the numerical aperture of the transparent light-refracting element to be at least as great as that of the light guide, or even greater. This ensures that the maximum possible angle range of the emitted light is collected and forwarded to the light guide. For this reason, it is also advantageous for the area of the envelope of the light-emitting faces of the semiconductor light sources as seen in plan view to be smaller than the entry face of the light-refracting transparent element. To this end, in particular, the light entry face of the light-refracting transparent element as seen in plan view should also fully cover the area of the envelope of the light-emitting faces of the semiconductor light sources. The effect achieved by this arrangement is that light rays emitted obliquely outwards by the light sources can still strike the light entry face and be reflected back by its wall, and thus fed into the light guide.

There are furthermore a variety of possibilities for extracting the light guided in the light guide. According to one embodiment of the invention, to this end the light guide may comprise a laterally emitting fibre. Such a light guide preferably has light-scattering structures at the interface between the core and the cladding. Such a light guide entails low absorption, together with defined lateral output of the light. However, terminal output at the end phase is likewise possible.

The invention is suitable particularly in conjunction with fibre bundles as light guides. In this case, a separate light mixer device in the form of a rod is recommendable. The light from the semiconductor light sources is available with a uniform spatial distribution and colour at the exit side of the rod, so that light with essentially equal intensity and colour is injected into the individual fibres.

This now allows the fibre bundle to be divided into a plurality of spatially separated ends so as to provide a plurality of individual light sources, all of which have the same colour as seen by the observer. One or more of the ends may also have optical jack connectors or connection devices by which, for example, it is possible to couple further light guides that are connected to the light exit face visible to the user.

With such an illumination arrangement, inter alia, the separate light sources may then illuminate different displays of a vehicle dashboard arrangement.

In a refinement of the invention an adjustment or control device, for varying the light intensity of at least two of the semiconductor light sources, may then be provided in order to vary the colour of the emitted light. In this way, for example, the colour and brightness and therefore the appearance of a dashboard or a vehicle driver's compartment may be varied. Such adaptation may be carried out manually by means of an adjustment device which the driver can operate, so that the driver can select the appearance of the dashboard or driver's compartment according to their personal preference. It is also possible to carry out coloured presetting which is adapted to the interior equipment.

Compared with conventional LED lighting, an illumination arrangement according to the invention offers the advantage that more complex luminous shapes can be produced with the light exit face or faces of the one or preferably more light guides, while a high efficiency can be achieved at the same time. Inter alia, the visible light exit face of the light guide may have a radially asymmetric shape. Thus, besides point-like light exit faces, it is also possible in particular to produce linear, for instance frame-shaped light exit faces.

In order to form complexly shaped luminous faces, in the case of a fibre bundle as the light guide, the fibres of the fibre bundle, or at least one of the spatially separated ends of the fibre bundle, may be arranged in a fan shape next to one another and illuminate or form a light exit face.

In the simplest form of the invention, a section of the light guide at the light entry end may also form the transparent light-refracting element, in which case the light guide is a single guide.

In a further configuration of the invention, as an alternative or in addition to an element which mixes by total reflection, it is also possible to provide a light mixer which comprises condenser optics. For effective light mixing, these optics may respectively comprise at least one lens assigned to a light source.

Differently coloured light-emitting diodes are furthermore preferably used as the semiconductor light sources. The colour need not necessarily be the colour emitted directly by the light-emitting diode; rather, it is also feasible to convert the colour of one or more LEDs. Inter alia white-light LEDs, which per se contain a blue LED whose light is converted by fluorescent dye into a spectrum that appears white, may also be envisaged here. In this case, one or more further LEDs may additionally be added so as to deliberately reinforce spectral ranges in the mixed light, and thus modify the colour temperature of the light. If only white light is desired in various tones, and for example adaptable tones, then even much weaker LEDs may be sufficient as a supplement to the white-light LED under certain circumstances.

Nevertheless, a preferred illumination arrangement comprises in particular an arrangement with two green, one blue and one red light-emitting diode. Such a multiple LED is particularly suitable for generating arbitrary colours, including white tones with an adjustable colour temperature.

Glass, in particular, is preferred as a material for the light guides. The same also applies for the light-refracting element or elements of the light mixer. Glass is more resistant to ageing and heat compared with plastics. These properties also make optical glass elements particularly suitable for use in all types of vehicles since, inter alia, it is here in particular that large temperature differences arise and longevity is required.

The thermal stability of glass also allows the glass light guide to be embedded in a shaped plastic part, preferably an injection-moulded plastic part. Conversely, plastic light guides would melt at the temperatures which occur during injection moulding. By embedding the light guide or guides in shaped plastic parts, the opportunities for shaping luminous elements can further be extended significantly.

Inter alia it is feasible to illuminate control elements, such as switches or selector knobs, by using an illumination device according to the invention. In particular displays, knobs and switches of a dashboard or cockpit of a motor vehicle may also be equipped with such an illumination device. Interior illumination of a vehicle by an illumination device according to the invention is also possible.

The invention will be explained in more detail below with the aid of exemplary embodiments and with reference to the appended drawings. In the figures, references which are the same denote identical or similar parts.

Figure 2:
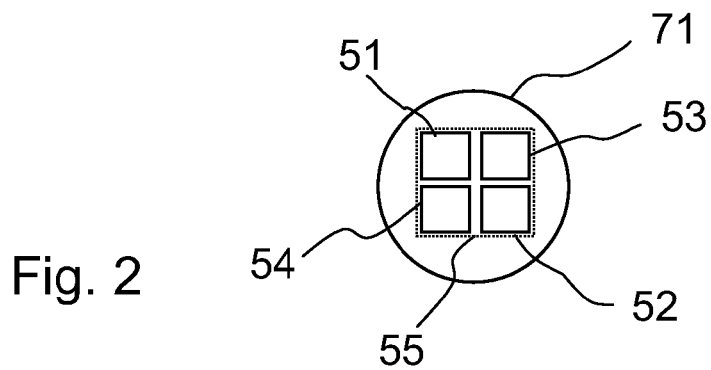
Figure 3:
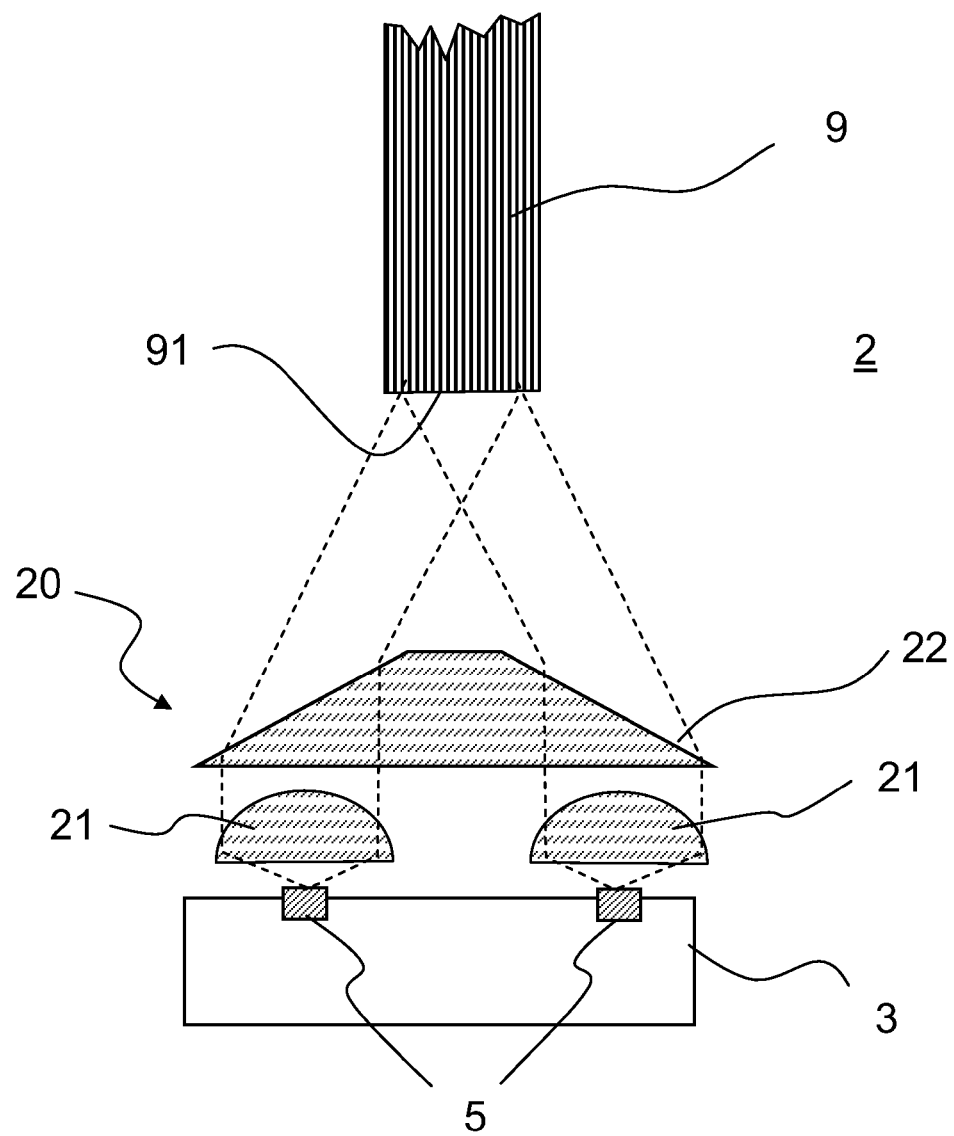
Figure 4:
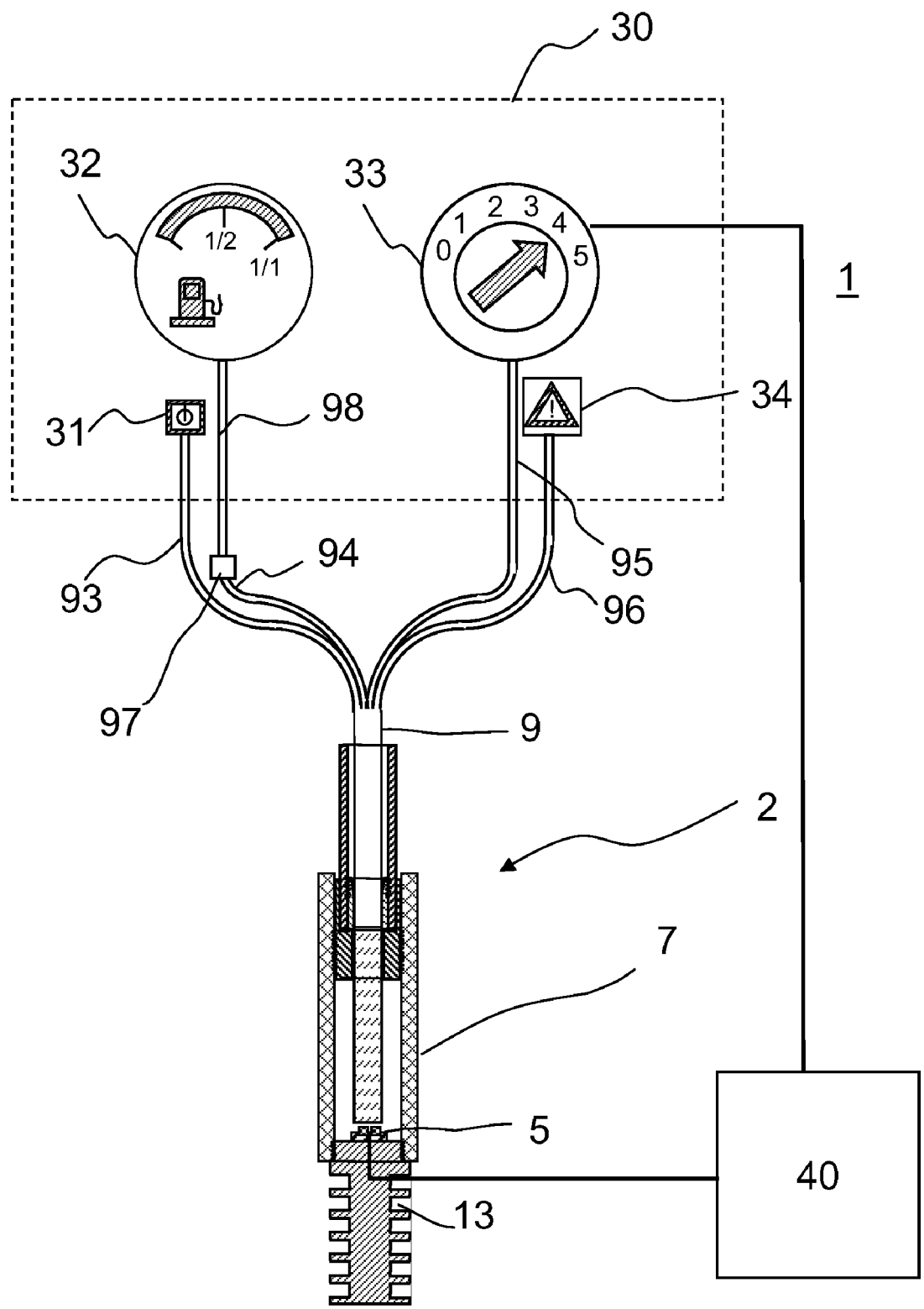
Figure 5:
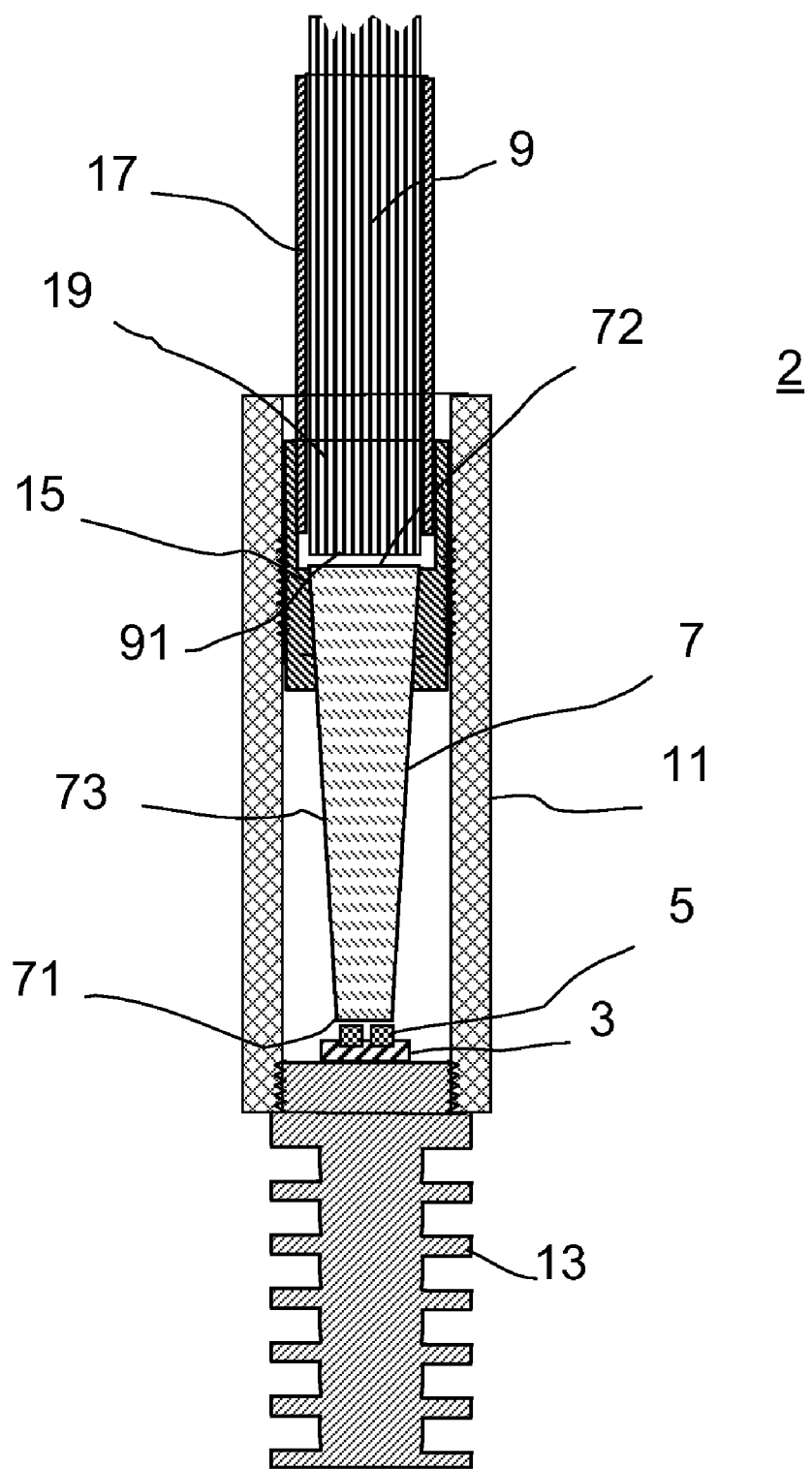

FIG. 1 shows a schematic cross-sectional view of a lighting unit of an illumination device, FIG. 2 shows a plan view of the light entry face of the transparent light-refracting rod of the lighting unit represented in FIG. 1, FIG. 3 shows a variant of the embodiment represented in FIG. 1 with a condenser arrangement for the light mixing, FIG. 4 shows a schematic representation of a cockpit illumination of a motor vehicle with an illumination device according to the invention, and FIG. 5 shows a further variant of the lighting unit shown in FIG. 1.

FIG. 1 shows a lighting unit, denoted overall by the reference 2, of an illumination device according to the invention. The lighting unit 2 comprises a support 3 with a plurality of light-emitting diodes 5, which are held in a cover 11. To this end, in the example shown in FIG. 1, the support 3 is mounted on a heat sink 13 which is screwed into the cover 11. A frame 15, in which an end sleeve 17 is fastened, is furthermore screwed into the cover 11. The end sleeve 17 holds a light guide 9 in the form of a fibre bundle. The light guide 9 is centred by means of a reducer sleeve 19 arranged in the end sleeve. A transparent light-refracting rod 7 with end faces 71, 72 is furthermore arranged in the frame 15, so that the end face 71 lies in front of the light-emitting diodes 5 and the other end face 72 lies in front of the end face 91 of the fibre bundle 9.

The end face 71 is accordingly used as the light entry face of the rod 7, and the end face 72 is used as the light exit face. The distance from the end face 72 to the fibre bundle 9, as well as the distance from the end face 71 to the light-emitting diodes 5, will generally be kept as small as possible, without restriction to the example represented, in order to obtain maximally effective injection of the light into the rod 7 and from the rod 7 into the light guide 9. In order to optimize the injection of light, the end face 72 of the rod 7 is matched in shape and size to the light entry face of the 91 fibre bundle 9.

The light-emitting diodes 5 have different colours. An arrangement of 4 light-emitting diodes is preferably used, a combination of one red-emitting and one blue-emitting with two green-emitting light-emitting diodes being particularly suitable for obtaining white light by additive colour mixing of these diodes. In order subsequently to distribute the light by means of the light guide onto a plurality of separate light sources visible to be the observer, all of which have the same colour impression, according to the invention the light is mixed so that there is an essentially uniform intensity distribution of all the diodes 5 over the entry face 91 of the light guide. This is achieved in a particularly straightforward way by the light mixer device comprising the rod 7.

Part of the light is reflected by the wall 73, whereas another part of the light reaches the light exit face, i.e. the end face 72 of the rod, without reflection. Since, in the arrangement represented, the light is reflected towards the optical axis owing to the light refraction at the plane end face 72, the proportion of radiation not reflected is moreover comparatively high when a short rod is selected.

Even the non-reflected rays from the individual light-emitting diodes are mixed very well, since the intensity of these rays at the light entry end 91 of the light guide is essentially influenced only by the intensity decrease for these rays which is determined by the different distances from the diodes to a respective point on the light entry face 91. So long as a certain minimum length of the rod 9 is complied with in relation to the distance from the light-emitting diodes 5, this intensity difference may be neglected. Without restriction to the example represented, it is generally preferable in this case for the length of the light-refracting transparent element of the light mixer device to be longer by at least a factor of 3 than the maximum centre spacing of the individual semiconductor light elements being used.

In any event, as in the example represented in FIG. 1, it is possible to use a comparatively short rod 7 whose length in the light propagation direction is at most eight times the smallest lateral dimension of the light entry face. In the example shown in FIG. 1, the rod 7 is only about a factor of 5 longer than the diameter of the entry face 71.

The refractive index, the length and shape of the rod 7 may generally be dimensioned so that the average number of reflections of all the rays guided through the element and re-emerging from the element is less than one. If the rod 7 were to be entirely omitted, then good mixing of the colours would thus also be obtained per se. In this case, however, the efficiency would be drastically reduced. The numerical aperture of the rod 7 will furthermore preferably be selected so that it is at least as great as the numerical aperture of the individual fibres of the light guide 9. In order to inject as much light as possible into the rod 7, the distance from the light-emitting upper sides of the LEDs 5 to the light entry face is at most ⅕ of the side dimension of the light entry face, i.e. at most ⅕ of the diameter in the case of a cylindrical rod.

The rod 7 furthermore has a cylindrical shape in the example shown in FIG. 1. As an alternative, the rod may also have a prismatic shape with square or rectangular, or in general even polygonal end faces.

FIG. 2 in this regard shows a plan view of the light entry face 71 of the rod 7 of the lighting unit 2 represented in FIG. 1 as seen in the axial direction, i.e. along the optical axis of the rod 7. In the example shown in FIG. 2, the rod has a circular cross-sectional surface. Accordingly, the rod is cylindrical in this case. Four light-emitting diodes 51, 52, 53, 54 which are arranged in a matricial 2×2 configuration as seen in the light propagation direction, below the light entry face 71, are provided for the illumination.

As may be seen with the aid of FIG. 2, the area of the imaginary contour of the outer edges of the individual light-emitting faces, i.e. the area of the envelope 55, is smaller as seen in plan view than the entry face 71. This applies not only for the area size, but in particular also for the side dimensions of the light entry face 71 and the envelope 55. Thus, the diagonals of the envelope 55 are shorter than the diameter of the light entry face 71.

The light-emitting diodes 51, 52, 53, 54 are also arranged so that the light entry face 71 fully covers the area of the envelope of the light-emitting faces of the semiconductor light sources as seen in plan view along the optical axis.

FIG. 3 schematically shows a variant of the example shown in FIG. 1. Instead of a light-refracting totally reflecting rod 7, in this example condenser optics 20 are provided. The light from the light-emitting diodes 5 is in this case focused and imaged parallel by condenser lenses 21 respectively arranged over the light-emitting diodes 5.

A prism 22 is provided, by which the parallel beam of rays being generated is deviated and superimposed on the entry-side end face 91 of the light guide. Very good colour mixing can be achieved with such an arrangement, especially in the case of small-area or virtually point-like light-emitting diodes, since well-defined parallel ray beams can be generated for small light sources.

FIG. 4 shows an exemplary embodiment of an illumination device 1 for a cockpit 30, schematically symbolized by the dashed contour. The cockpit 30 comprises various illuminated display and control elements. In the example shown in FIG. 4, the cockpit comprises in particular an on/off switch 31 for an instrument, a fuel gauge display 32, a selector knob 33 and a switch 34 for operating the hazard warning lights. Surfaces that are illuminated by way of example are respectively represented by shading.

The fibre bundle of the light guide 9 is divided into a plurality of spatially separated ends 93, 94, 95, 96. Each of the ends 93, 94, 95, 96 is respectively connected to one of the control and display elements 31, 32, 33, 34 and guides the light from the light-emitting diodes 5 to the respective light exit faces. These may, for example, be designed as transparent shaped plastic parts in which the fibre ends are embedded. In order to produce more complex geometries of luminous faces, according to one embodiment of the invention the ends of the light guide may be fanned out, the individual fibre ends up being arranged next to one another in accordance with the geometry of the luminous face. Thus, in the exemplary embodiment shown in FIG. 4, none of the luminous faces represented by shading on the display and control elements has a simple radially symmetric shape. The two switches 31 and 34 have for example frame-shaped, for example linear peripheral luminous faces with a radially asymmetric shape. It is therefore difficult for such luminous faces to be illuminated homogeneously by single light sources.

In addition to this, the luminous faces of the display and control elements 31, 32, 33, 34 have exactly the same colour, and consistent relative brightnesses, owing to the central illumination by means of the lighting unit and the light mixer device. Furthermore, the brightness and/or colour of the luminous faces may also be adapted individually.

To this end, in the example shown, an adjustment device 40 is provided by which the electricity supply of the LEDs 5 is adjusted and/or regulated. The selector knob 33 is used here to set the adjustment device 40, for example, so that the colour and/or brightness of all the luminous faces can be adjusted uniformly by the selector knob 33. Accordingly, in order to modify the colour, the lighting intensities of at least two of the LEDs 5 are adjusted relative to one another by means of the adjustment device 40.

The individual ends of the light guide 9 need not lead directly into the luminous faces. Rather, for example for simpler wiring, it may also be expedient for the light guide 9 or at least one of the separate ends to be provided with an optical connection device in order to couple a further optical element, and in particular a further light guide. In the example shown in FIG. 4, the end 94 of the light guide 9 is equipped with an optical jack connector 97. The jack connector 97 is used to attach a further light guide 98, which is finally connected to the luminous face of the fuel gauge display 32.

Vehicle interior lighting may also be produced in a corresponding way with an arrangement as described above. Inter alia signal illumination, for instance luminous marking strips in aircraft, may also be envisaged in this case.

FIG. 5 shows another variant of the lighting unit 2 shown in FIG. 1. In this variant a conical rod 7 is used instead of a generally prismatic, in particular cylindrical rod 7. The rod 7 is fitted in such a way that the light entry face 71 is smaller than the light exit face. The light exit face 72 coupled to the light guide then fully covers the entry face 71 as seen in plan view.

This shape is favourable since an even larger solid angle of the light emitted by the light-emitting diodes 5 is fed to the light exit face. The numerical aperture is also increased owing to the shape widening along the optical axis in the light propagation direction, since it increases the incidence angle of the light rays on the wall 73 and it reduces the proportion of rays striking the wall but not being totally reflected.

It is clear to the person skilled in the art that the invention is not restricted to the exemplary embodiments described above. Rather, the exemplary embodiments may be modified in a variety of ways, and their individual features may be combined with one another.

The invention claimed is:

1. An illumination device for illuminating with an arbitrary light color at a plurality of illuminated places, comprising:
a semiconductor support;
a combination of at least two semiconductor light sources for emitting light of different intensities and/or colors, the semiconductor light sources having flat light-emitting surfaces;
electrical power supply means for energizing the semiconductor light sources individually;
adjusting means for controlling the electrical power supply means so as to adjust or regulate the intensity and/or color of each of the flat light emitting surfaces individually;
a rod of transparent, uniformly light-refractive material having a light-entry face, a light-exit face, and an envelope surface connecting the light-entry face with the light-exit face, the rod having a length and, transversely thereto, lateral dimensions that are sometimes smaller than the length of the rod, the rod acting as a light mixer of the light emitted by the semiconductor light sources so as to deliver the arbitrary light color at the exit face of the rod;
a fiber bundle comprising a plurality of optical fibers, each having a light-entry face close to the light-exit face of the rod for receiving light exiting from the rod, and a light-exit face for providing one of the illuminated places; and
means for fastening the semiconductor support, the rod, and the fiber bundle together to form a unit, such that the light-entry face of the rod is close to the flat light-emitting surfaces of the semiconductor light sources, the fastening means including a frame surrounding the rod adjacent its exit face leaving most of the envelope surface uncovered;
the combination of the at least two semiconductor light sources having a light emitting surface area which is smaller than the light-entry face of the rod, and
the light-entry face of the rod being equal in size to, or smaller than, the light-exit face of the rod.

2. The illumination device according to claim 1 wherein the rod is of a cylindrical shape, and wherein the envelope surface of the rod, at most of the rod's length, is exposed to air within the fastening means.

3. The illumination device according to claim 1 wherein the rod has a numerical aperture and is of a conical shape with the light-entry face of the rod increasing to the light-exit face of the rod, such that a numerical aperture of the rod is increased for light that is totally reflected at the envelope surface of the rod.

4. The illumination device according to claim 1 wherein four light-emitting diodes are arranged in a matricial 2×2 configuration, and wherein the rod has a cross section at least locally with straight edges arranged at a right angle to one another, the cross section being constant or increasing from the light-entry face of the rod to the light-exit face of the rod.

5. The illumination device according to claim 1 wherein the light exit face of the rod is matched to the light entry face of the fiber bundle.

6. The illumination device according to claim 1 wherein the light entry face of the fiber bundle is made for a refractive power not exceeding one dioptre in magnitude.

7. The illumination device according to claim 1 wherein the light-entry face of the rod has a lateral dimension which is longest, and where there is a distance between the flat light-emitting faces of the semiconductor light sources and the light-entry face of the rod, the distance being at most ⅕ of the longest lateral dimension of the light-entry face of the rod.

8. The illumination device according to claim 1 wherein the light entry face of the rod has a lateral dimension as from a diameter or an edge length, and an axial length in the light propagation direction which is at most eight times the lateral dimension.

9. The illumination device according to claim 1 wherein the fiber bundle includes a plurality of optical fibers, at least some of the optical fibers comprise a respective core, a respective cladding, and a respective interface between core and cladding, the interface including scattering structures so as to emit light in a lateral direction.

10. The illumination device according to claim 1 wherein the light exit faces of the fiber bundle are arranged at respective ends of the optical fibers, some of these fiber ends being spatially separated from other fiber ends.

11. The illumination device according to claim 10 wherein at least some of these fiber ends are spread out to form a fan.

12. The illumination device according to claim 1 wherein at least one of the optical fibers has an end provided with an optical connector.

13. The illumination device according to claim 12 wherein the optical connector is coupled to a further optical fiber that has a light exit face for providing one of the individual illuminated places.

14. The illumination device according to claim 13 wherein several optical connectors with optical fibers are provided to be connected to several individual illuminated places.

15. A device for illuminating with white light tones at a plurality of illuminated places, comprising:
    a semiconductor support;
    a combination of four light-emitting diodes in a metrical 2×2 configuration including one blue, one red, and two green diodes having flat light emitting surfaces;
    electrical power supply means for energizing the diodes to emit light with light intensities and colors that, after mixing, result in white light;
    a rod of transparent uniformly light-refractive material having a light entry face, a light exit face, and an envelope surface connecting the light entry face with the light exit face, the rod having a length and, transversely thereto, lateral dimensions that are sometimes smaller than the length of the rod, the rod acting as a light mixer of the light emitted from the blue, red, and green diodes so as to deliver the white light tones at the exit face of the rod;
    a fibre bundle comprising a plurality of optical fibers, each having a light entry face close to the light exit face of the rod for receiving light exiting from the rod, and a light exit face for providing one of the illuminated places; and
    means for fastening the semiconductor support, the rod, and the fiber bundle together to form a unit such that the light entry face of the rod is close to the flat light emitting surfaces of the semiconductor diodes configuration so that a particularly large angle range of the light emitted is collected by the rod, the fastening means including a frame surrounding the rod adjacent its exit face leaving most of the envelope surface uncovered;
    the diodes configuration having a light emitting surface area that is smaller than the light entry face of the rod; and
    the light entry face of the rod being equal or smaller than the light exit face of the rod.

16. The illumination device according to claim 15 wherein the rod is of a cylindrical shape, and wherein the envelope surface of the rod, at most of the rod's length, is exposed to the air within the fastening means.

17. The illumination device according to claim 15 wherein the fastening means include a cover having a first end fastening the semiconductor support and a second end fastening the frame which itself fastens the rod and the fiber bundle entry faces.

18. The illumination device according to claim 15, wherein the illumination device is part of a dashboard of a motor vehicle.

19. The illumination device according to claim 15, wherein the illumination device is part of an interior illumination of a vehicle.

20. The illumination device according to claim 15, wherein the illumination device is part of a signal illumination of a vehicle.

21. An illumination device for illuminating with an arbitrary light color at a plurality of illuminated places, comprising:
    a semiconductor support;
    a combination of at least two semiconductor light sources for emitting light of different intensities and/or colors, the semiconductor light sources having flat light-emitting surfaces;
    electrical power supply means for energizing the semiconductor light sources individually;
    adjusting means for controlling the electrical power supply means so as to adjust or regulate the intensity and/or color of each of the flat light emitting surfaces individually;
    a fiber bundle comprising a plurality of optical fibers arranged with a common light-entry face and with light-exit faces that provide the illuminated places;
    at least two lenses arranged side-by-side, each lens being disposed to obtain light from an assigned to one semiconductor light source to collect light emitted by the respective semiconductor light source; and
    a prism arranged to receive and unify the collected light from the lenses and for mixing the light of different colors by directing the collected light onto the light-entry face of the fiber bundle.

22. The illumination device according to claim 21, wherein the illumination device is part of a dashboard of a motor vehicle.

23. The illumination device according to claim 21, wherein the illumination device is part of an interior illumination of a vehicle.

24. The illumination device according to claim 21, wherein the illumination device is part of a signal illumination of a vehicle.

* * * * *